United States Patent Office 2,909,468
Patented Oct. 20, 1959

2,909,468

PREPARATION OF ADRENOCORTICOTROPHIN

Charles W. Damaskus, La Grange, Ill., assignor to Armour and Company, Chicago, Ill., a corporation of Illinois No Drawing. Application November 28, 1955
Serial No. 549,502

11 Claims. (Cl. 167—74)

This invention relates to the preparation of the adrenocorticotrophic hormone, and more particularly to a process for enhancing the subcutaneous potency of adrenocorticotrophin.

In Bunding U.S. Patent No. 2,669,536 is described a process in which an aqueous solution of adrenocorticotrophin (ACTH) can be contacted with a cellulose material, such as oxycellulose, at a pH of about 4.5 to adsorb the ACTH thereon, and in which the adsorbed ACTH can be eluted from the cellulose material with an aqueous solution at a pH of about 1.0 to 1.5. The treatment of porcine ACTH by the Bunding process results in a product which demonstrates, upon subcutaneous or intramuscular administration, an ACTH activity significantly greater than could be expected on the basis of increased purity, while the ACTH activity demonstrated by such product upon intravenous administration is substantially of the magnitude predicted on the basis of a reduced solids content. Thus, it can be said that the Bunding process effects an enhancement of the potency manifested by porcine ACTH upon subcutaneous administration. However, an enhancement of the potency of bovine and ovine ACTH of this magnitude is not obtained by the Bunding process, although a similar increase in the purity thereof is achieved.

It is an object of this invention to provide a process for enhancing the potency of ACTH preparations. Another object is to provide a process for enhancing the potency of ACTH manifested upon subcutaneous administration. Other objects and advantages will become apparent as the specification proceeds.

I have discovered a process in which ACTH can be treated with pyridoxine to enhance the potency thereof manifested upon subcutaneous administration. Thus the starting material of this invention is adrenocorticotrophin of submaximal subcutaneous potency. In this process, ACTH can be incubated with pyridoxine to achieve an enhancement in subcutaneous potency of approximately 400%, and the degree of enhancement may run as high as 900%. The incubuation of an aqueous mixture of ACTH with pyridoxine produces maximal enhancement of the subcutaneous potency in a decreasing period of time as the incubation temperature is increased. For example, this maximal enhancement may be achieved at room temperature in several months, whereas a similar enhancement can be obtained in relatively few hours at a temperature of about 100° C. However, it will be understood that this incubation temperature should be lower than that at which the ACTH activity would be destroyed. Also, it has been found that as the purity of the ACTH is increased the time required for maximal enhancement of the subcutaneous potency thereof will be decreased. For example, a dehydrated acidic 70% acetone extract of pituitary tissue may require from about 6 to 8 hours at a temperature of 100° C. to obtain maximal enhancement of the ACTH potency manifested upon subcutaneous administration, while ACTH prepared by the Bunding process may need from about 1 to 6 hours incubation at the same temperature to obtain a similar maximal enhancement.

The inclusion of pyridoxine in an aqueous mixture of ACTH during incubation produces an enhancement of the subcutaneous potency thereof significantly greater than can be obtained in the absence of pyridoxine, and the maximal enhancement of such potency may be achieved in a significantly shorter period of time. That is to say, at any incubation temperature, and any degree of purity of the ACTH, significant enhancement of the subcutaneous ACTH potency can be provided with pyridoxine in a considerably shorter period of incubation than in the absence of pyridoxine. For example, bovine ACTH prepared by the Bunding process can be treated with pyridoxine at a temperature of about 100° C. to obtain maximal enhancement in the subcutaneous potency thereof in about 4 to 6 hours, while similarly prepared bovine ACTH incubated at the same temperature, in the absence of pyridoxine, requires approximately 8 to 12 hours to achieve equivalent enhancement of such subcutaneous potency.

Although the advantages of this invention can be obtained with any pyridoxine derivative, better enhancement of ACTH potency may be obtained with an acid derivative of pyridoxine, and especially desirable results can be achieved with pyridoxine hydrochloride.

The pyridoxine may be included in an aqueous mixture of ACTH at a concentration of at least 0.005% (weight/volume). Better results can be obtained at a pyridoxine concentration of from 0.05 to 10% (weight/volume), and an especially desirable enhancement of ACTH potency may be achieved at a concentration of pyridoxine therein of about 0.1 to 3% (weight/volume), i.e. a concentration of about 1% (weight/volume) is suitable in commercial operations.

The effect of pyridoxine in enhancing the subcutaneous potency of ACTH is apparently optimal at a pH of from 3.5 to 5.5, although some enhancement may be obtained on both the alkaline and acid side of this pH range. Better enhancement can be achieved at a pH of from 4.0 to 5.0, and especially desirable results are produced at a pH of 4.7 and 4.8. The pH adjustment of the pyridoxine reaction mixture may be produced with any suitable alkali, acid or buffer, e.g. hydrochloric acid, sodium hydroxide, acetic acid-sodium acetate buffer solution, etc. The adjustment of an acidic solution of ACTH to a more alkaline pH, i.e. to at least pH 5.0, may result in the formation of a precipitate. A major portion of the suspended matter is solubilized during incubation in this process. After incubation has been completed a minor portion of an insoluble residue may remain in the aqueous mixture. This insoluble residue can be separated from the aqueous solution to obtain an ACTH of enhanced subcutaneous potency which is completely soluble in the neutral pH range, i.e. about pH 6.2 to 7.4 (physiological range). Separation of this residue may be accomplished by filtration, centrifugation, etc. The separated insoluble residue may demonstrate a small amount of ACTH activity.

The aqueous mixture of ACTH and pyridoxine should be incubated at a temperature of at least 15° C. However, in the adaptation of this process to commercial manufacture the incubation temperature may be from 30 to 150° C. to reduce the period of time required to achieve maximal enhancement of the ACTH potency. Better results can be obtained at an incubation temperature of from 75 to 125° C., and especially desirable incubation is achieved at a temperature of about 90 to 100° C.

This process may be utilized in enhancing the subcutaneous potency of any adrenocorticotrophin, although better results can be achieved with ovine ACTH, and especially desirable enhancement is obtained with bovine ACTH. For example, the starting material may be any mammalian pituitary tissue, such as hog, beef and sheep pituitary glands. Also, this starting material may be a derivative of pituitary tissue such as an extract of pituitary tissue, e.g. a glacial acetic acid extract, crude corticotrophin, or the afore-mentioned dehydrated acidic 70% acetone extract of pituitary tissue and ACTH prepared by the Bunding process. This process is especially applicable to the enhancement of the subcutaneous potency of bovine and ovine ACTH prepared by the Bunding process, although some enhancement of subcutaneous potency of similarly prepared porcine ACTH can be achieved with such process, i.e. in the order of about 20 to 50%.

I have found that the inclusion of an organic reducing agent containing at least one sulfhydryl group in the aqueous mixture of ACTH and pyridoxine, during incubation, at a pH of about 4.7, neutralizes the effect of pyridoxine such that substantially no enhancement of potency is obtained. However, ACTH previously treated with pyridoxine according to this process can be stabilized by the inclusion therein of this reducing agent. Although this reducing agent may be, for example, beta mercaptoethanol or thioglycollic acid, especially desirable results can be achieved with cysteine, e.g. 1-cysteine hydrochloride and 1-cysteine base. Stabilization of the ACTH prepared by this process can be provided by mixing in an aqueous solution thereof at least 0.025% (weight/volume) of this reducing agent. When this reducing agent is cysteine better stabilization can be obtained at a concentration thereof within the range of 0.05 to 5% (weight/volume), and especially desirable results can be obtained with cysteine at a concentration of about .1% (weight/volume). To achieve significant stabilization with this special reducing agent, the pH of the pyridoxine-treated ACTH solution may be in the range of pH 5.5 to 7.5.

If desired, gelatin can be included in the aqueous mixture of ACTH and pyridoxine to obtain an additional enhancement of the ACTH potency manifested upon subcutaneous administration. Also, this additional enhancement in subcutaneous potency can be achieved by incorporating gelatin into an aqueous solution of pyridoxine-treated ACTH prior to administration. The gelatin concentration of the incubation mixture or ACTH solution may be from about 8 to 40% (weight/volume), and a desirable fluidity thereof can be obtained with partially hydrolyzed gelatin at a concentration of about 16% (weight/volume). On the other hand, the gelatin may be further hydrolyzed to a gel point of less than 22° C., whereupon an equivalent fluidity in the incubation mixture or ACTH solution may be provided at a gelatin concentration of at least 28% (weight/volume), and sometimes as high as 32% (weight/volume). The gelatin may be hydrolyzed by autoclaving at a pressure of 15 p.s.i.g. for a period of about 15 to 60 minutes or until the desired gel point is obtained.

A preservative, such as propyl or methyl parahydroxybenzoate or a combination thereof, can be included in the incubation mixture, or in a solution of pyridoxine-treated ACTH, and especially desirable results can be obtained with a preservative, which also demonstrates local anesthetic action, such as phenol.

The ingredients employed in this process should be suitable for parenteral administration to human beings when the resulting ACTH product is intended for human use, and suitable for parenteral administration to animals when such product is utilized as a veterinary preparation.

The subcutaneous potency of ACTH prepared by this process can be determined according to the corticotrophin assay procedure set forth in the U.S. Pharmacopeia, vol. XV (1955).

This invention can be further illustrated by the following specific examples:

*Example I*

Bovine ACTH prepared by the Bunding process, in the amount of 300 mg., was suspended in 150 ml. of pyrogen-free water. To the resulting suspension was added 15 gms. of pyridoxine hydrochloride and 0.75 gm. of phenol. This solution had a pH of 3.0. Portions of this solution were adjusted to a specific pH with either a 10% hydrochloric acid solution or a 10% sodium hydroxide solution. Each portion, in the amount of 20 ml., was incubated at a temperature of 37° C. for a period of two weeks. At the end of the incubation period each preparation was analyzed by the SCG procedure using 8 hypophysectomized rats per preparation.

The analytical results were as follows:

| pH of preparation | Potentcy (USP units per ml.) |
|---|---|
| 2.0 | 21.0 |
| 3.0 | 22.8 |
| 4.0 | 51.2 |
| 5.0 | 73.8 |
| 6.0 | Inactive |
| 7.0 | Inactive |

These results indicate that the pH optimum for the treatment of bovine ACTH prepared by the Bunding process is within the range of about pH 4.0 to 5.0, although some effect can be obtained at a pH outside this range.

*Example II*

Bovine ACTH prepared by the Bunding process, in the amount of 400 mg., was dissolved in 14 ml. of pyrogen-free distilled water. To the resulting solution was added 1 gm. of pyridoxine hydrochloride, and such solution was adjusted to a pH of 4.7 with a 10% sodium hydroxide solution. This solution was filled into 5 ml. glass vials, 2.5 ml. per vial. The filled vials were sealed and immersed in a boiling water bath. A portion of the vials were removed from the bath at intervals of 1 hour. Each portion was centrifuged, and 1 ml. of the supernatant liquid was diluted to a volume of 5 ml. with a 16% aqueous gelatin solution containing 0.5% of phenol. Each preparation was analyzed by the SCG assay procedure using 8 hypophysectomized rats per preparation. The analytical results were as follows:

| Incubation Time (hours) | Potency of Assay Sample (USP units/ml.) | Calculated Potency of Preparation (USP units/ml.) |
|---|---|---|
| 0 | 18.3 | 91.5 |
| 1 | 22.8 | 114.0 |
| 2 | 34.5 | 172.5 |
| 4 | 83.7 | 418.5 |
| 6 | 112.2 | 560.0 |
| 8 | 36.6 | 183.0 |

These results indicate that maximal enhancement of the subcutaneous potency of bovine ACTH prepared by the Bunding process can be produced at a pH 4.7 and a temperature of about 100° C. in about 6 hours.

*Example III*

The ACTH preparation obtained by the method of Example II, after 6 hours of incubation in a boiling water bath and diluted five-fold with a 16% aqueous gelatin solution containing 0.5% of phenol, in the amount of 4 ml., was further diluted to a volume of 22 ml. with a 16% aqueous gelatin solution containing 0.5% of phenol. This dilute solution was filled into 5 ml. glass vials, 3 ml. per vial. The filled vials were incubated in a boiling water bath, and a portion of the vials removed from the water bath at selected time intervals. The contents of these vials were analyzed by the SCG assay procedure, using 8 hypophysectomized rats per preparation.

The results were as follows:

| Incubation Time (hours) | Potency of Assay Sample (USP units/ml.) | Calculated Potency of Initial Preparation (USP units/ml.) |
| --- | --- | --- |
| 0 | 11.2 | 318 |
| 0.5 | 10.2 | 280 |
| 1 | 13.4 | 368 |
| 2 | 11.8 | 325 |
| 3 | 10.2 | 280 |
| 4 | 14.0 | 385 |

These results indicate that at five-fold dilution the 6 hour incubated product can be further incubated for as long as 4 hours without significant loss in potency.

*Example IV*

Crude corticotrophin, in the amount of 210 ml. was dissolved in 30 ml. of pyrogen-free distilled water. To the resulting solution was added 750 ml. of pyridoxine hydrochloride, and the pH of such solution was adjusted to 4.7 with a 10% solution of hydroxide solution. This solution was filled into 5 ml. glass vials, 1.5 ml. per vial. The filled vials were sealed and immersed in a boiling water bath. Portions of the vials were removed from the bath at selected time intervals. These preparations were analyzed by the SCG assay procedure using 8 hypophysectomized rats per preparation.

The results were as follows:

| Incubation Time (hours) | Potency of Assay Sample (USP units/ml.) | Calculated Potency of Preparation (USP units/mg. of solids) |
| --- | --- | --- |
| 0 | 3.1 | .44 |
| 4 | 9.9 | 1.40 |
| 6 | 15.0 | 2.10 |
| 10 | 4.8 | 0.70 |

These results indicate that the maximal enhancement of crude corticotrophin can be obtained in about 6 hours at a temperature of about 100° C. and a pH of 4.7.

*Example V*

Porcine ACTH prepared by the Bunding process, in the amount of 13 ml., was mixed with 325 mg. of pyridoxine hydrochloride. The resulting solution was adjusted to pH 4.7 with a 10% sodium hydroxide solution. This solution was filled into a 50 ml. glass vial. The filled vial was sealed and immersed in a boiling water bath. Portions of the vial contents were removed at selected time intervals. Portions, in the amount of 1 ml., were diluted with 29 ml. of a 16% aqueous gelatin solution containing 0.5% phenol. Other portions, in the amount of 1 ml., were diluted with 14 ml. of a 16% aqueous gelatin solution containing 0.5% phenol. The preparations were analyzed by the SCG assay procedure using 8 rats per preparation.

The results were as follows:

| Incubation Time (hours) | Potency of Assay Sample (USP units/ml.) | Calculated Potency of Preparation (USP units/ml.) |
| --- | --- | --- |
| 0 | 14.1 | 423. |
| 1 | 19.5 | 585. |
| 2 | 9.6 | 144. |
| 3 | 10.8 | 162. |
| 4 | Inactive | Inactive. |
| 5 | do | Do. |
| 6 | do | Do. |
| 8 | do | Do. |

These results indicate that maximal enhancement of porcine ACTH prepared by the Bunding process can be effected at a temperature of 100° C. and a pH of 4.7 in about 1 hour.

*Example VI*

A preparation of porcine ACTH, obtained by the Bunding process, contained in a 16% aqueous gelatin solution and stored for a period of at least 2 years was treated with pyridoxine according to the following method:

This ACTH-gelatin solution had lost potency during storage and contained approximately 4 USP units per ml. The preparation, in the amount of 100 ml., was mixed with 10 gms. of pyridoxine hydrochloride. Portions of the resulting mixture were adjusted to selected hydrogen ion concentrations, and incubated at a temperature of 37° C. for a period of two weeks. The incubated products were analyzed by the SCG assay procedure using 8 rats per product.

The results were as follows:

| pH of Product | Potency of product (USP units/ml.) |
| --- | --- |
| 3.5 | 11.1 |
| 4.5 | 14.7 |
| 5.5 | 10.7 |

These results indicate that potency of ACTH lost during storage can be regenerated with pyridoxine.

*Example VII*

Bovine ACTH, prepared by the Bunding process, in the amount of 1 gm., was dissolved in 100 ml. of pyrogen-free distilled water. To the resulting solution was added 2.5 gms. of pyridoxine hydrochloride, and such solution was adjusted to a pH of 4.7 with a 10% sodium hydroxide solution. This solution was filled into glass vials, and the filled vials sealed and incubated in a boiling water bath for a period of 6 hours. The product thereby obtained had a potency of 306 USP units per ml. This product was further incubated in the boiling water bath for a period of 40 minutes, and the resulting preparation had a potency of 391 USP units per ml.

This pyridoxine-treated product, in the amount of 50 ml., was diluted to 500 ml. with a 16% aqueous gelatin solution containing 0.5% of phenol. The diluted product was utilized in preparing the following formulations:

(A) A portion of this pyridoxine-treated product, 300 ml. was sterile-filtered and filled into 5 ml. glass vials, 5 ml. per vial.

(B) To 110 ml. of product (A) was added 100 mg. of cysteine, and the resulting solution was sterile-filtered. The sterile solution was filled into 5 ml. vials, 5 ml. per vial.

(C) To 100 ml. of the pyridoxine-treated product was added 30 ml. of a 16% aqueous gelatin solution, containing 0.5% of phenol, and 110 mg. of crystalline vitamin $B_{12}$. The resulting solution was sterile-filtered and filled into 5 ml. vials, 5 ml. per vial.

(D) A bovine ACTH preparation, obtained by the Bunding process, contained in a pH 6.5, 16% aqueous gel solution, in the amount of 210 ml., was sterile-filtered and filled into 5 ml. vials, 5 ml. per vial (control).

(E) A control ACTH gelatin solution (product D above), in the amount of 210 ml., was mixed with 210 mg. of cysteine. The resulting solution was sterile-filtered and filled into 5 ml. vials, 5 ml. per vial.

Each of the foregoing formulations was analyzed using two three level SCG assays. A portion of each product was incubated for 8 and 16 hours at a temperature of 100° C. for stability determination. These incubated products were analyzed by the SCG assay procedure using 8 rats per product.

The results were as follows:

| Product | Potency (USP units/ml.) | | | Stability Determination: 8 and 16 hr. incubation period (USP units/ml.) | |
|---|---|---|---|---|---|
| | Estimated | Assay (2 determinations) | Assay, Mean | 8 | 16 |
| A | 40 | { 34.8±4.0 <br> 28.0±2.4 } | 30.3±2.6 | 17.7 | 10.5 |
| B | 40 | { 33.6±6.4 <br> 33.3±4.3 } | 33.4±4.3 | 15.8 | 12.9 |
| C | 30 | { 39.0±6.9 <br> 28.4±4.0 } | 31.2±3.4 | 8.1 | 6.0 |
| D | 40 | { 24.8±4.0 <br> 26.5±2.5 } | 26.1±2.1 | 9.4 | 5.1 |
| E | 40 | { 32.0±4.0 <br> 27.2±3.2 } | 30.0±2.7 | 15.6 | 6.2 |

*Example VIII*

Bovine ACTH prepared by the Bunding process, in the amount of 2 gms., was suspended in 220 ml. of pyrogen-free distilled water. To the resulting suspension was added 5 gms. of pyridoxine hydrochloride, and the suspension was adjusted to a pH 4.7 with a 10% sodium hydroxide solution.

The suspension was filled into 50 ml. vials, and after sealing, the vials were immersed in a boiling water bath to be incubated for a period of 6 hours and 40 minutes. A portion of the incubated product, in the amount of 1 ml. was diluted with 7 ml. of a 15% aqueous gelatin solution containing 0.5% of phenol. This gelatin product, upon analysis in the SCG assay, using three levels, was found to contain a potency of 50.5±7 USP units per ml.

Predicated upon this assay result, 200 ml. of the incubated product was diluted with 1600 ml. of a 16% aqueous gelatin solution containing 0.5% of phenol. This diluted product was sterile filtered through an Ertel No. 8 pad, and filled into 5 ml. glass vials, 5.4 ml. per vial.

Portions of the vial product were incubated at a temperature of 100° C. for periods of 8 and 16 hours for stability determination. These products were analyzed by the SCG assay procedure and the USP intravenous corticotrophin method. The results were as follows:

| Product | Potency (USP units/ml.) | |
|---|---|---|
| | IV | SCG |
| Incubated preparation | 15.2±3.2 | { 39.6±5.2 <br> 53.9±8.8 <br> 44.8±5.2 } mean=44.6±3.4 |
| Incubated preparation after 8 hrs. at 100° C. | 9.3 | 22.0 |
| Incubated preparation after 16 hrs. at 100° C. | 7.8 | 9.2 |

These results indicate that, in some instances, enhancement of the potency manifested by ACTH upon intravenous administration may be achieved, in addition to the enhancement of subcutaneous potency.

*Example IX*

Bovine ACTH, prepared by the Bunding process, in the amount of 200 mg., was dissolved in 20 ml. of pyrogen-free water. To the resulting solution was added 500 mg. of pyridoxine hydrochloride, and such solution was adjusted to a pH of 4.7 with a 20% sodium hydroxide solution. This solution was filled into a 30 ml. glass vial, and the filled vial was incubated in a boiling water bath. Portions of the vial contents were removed at selected time intervals. These portions were diluted 1:10 with a 16% aqueous gelatin solution containing 0.5% of phenol. The resulting preparations were analyzed by the SCG assay precedure using 8 rats per preparation. The results were as follows:

| Incubation Time (hours) | Potency of Assay Sample (USP units/ml.) | Calculated Potency of Preparation (USP units/ml.) |
|---|---|---|
| 0 | 13.5 | 135 |
| 3.5 | 18.6 | 186 |
| 4 | 47.6 | 476 |
| 4.5 | 40.4±5.2 | 404 |
| 8 | 24 | 240 |
| 10 | 13.6 | 136 |

The preparation obtained in the foregoing process after 4.5 hours of incubation, in the amount of 10 ml., was adjusted to pH 6.5 with a 20% sodium hydroxide solution. To this solution was added 100 mg. of cysteine. The resulting mixture was filled into glass vials, and the filled vials were incubated in a boiling water bath. Portions of the vials were removed from the bath at selected time intervals, and the contents thereof diluted 1:10 with a 16% aqueous gelatin solution containing 0.5% of phenol. These preparations were analyzed by the SCG assay procedure using 8 rats per preparation. The results were as follows:

| Incubation Time (hours) | Potency of Assay Sample (USP units/ml.) | Calculated Potency of Preparation (USP units/ml.) |
|---|---|---|
| 0.5 | 35.2 | 352 |
| 3.5 | 93.6 | 936 |
| 5.5 | 29.1 | 291 |

These results indicate that bovine ACTH, obtained by the Bunding process, can be treated with pyridoxine to enhance the subcutaneous potency thereof, and that the resulting product can be treated with cysteine at a pH of 6.5 and a temperature of about 100° C. without destroying the subcutaneous ACTH activity thereby generated.

*Example X*

Bovine ACTH, prepared by the Bunding process, in the amount of 2 gms., was dissolved in 200 ml. of pyrogen-free distilled water. To the resulting solution was added 5 gms. of pyridoxine hydrochloride, and such solution was adjusted to pH 4.7 with a 20% sodium hydroxide solution. This solution was filled into 50 ml. vials, and the filled vials were incubated in a boiling water bath for a period of 4.5 hours. Then the vial contents were removed and mixed to form a composite product. This composite product was adjusted to pH 6.5 with a 20% sodium hydroxide solution, and to the resulting solution was added 2 gms. of cysteine. This solution was filled into 50 ml. vials, and the filled vials were sealed and incubated in a boiling water bath for a period of 2 hours.

A portion of the incubated product, 1 ml., was diluted with 9 ml. of a 16% aqueous gelatin solution containing 0.5% of phenol. The resulting solution had an SCG potency (two assays) of 31.2±4.4 and 35.4±3.6 with a mean of 33.8±2.9 USP units per ml.

The remainder of the incubated product was clarified by filtration through a fine sintered-glass filter. The filter residue was dried and obtained in a yield of 374 mg. The filtrate, 190 ml., was diluted with 855 ml. of a 32% aqueous gelatin solution, containing 1.0% of phenol, and 665 ml. of pyrogen-free distilled water. This preparation had an SCG potency of 40.8±6.0 USP units per ml.

The ACTH-gelatin solution was sterile-filtered through an E-8 pad and asceptically filled into 5 ml. glass vials, 5.5 ml. per vial. The vial product had an SCG potency (two assays) of 36.4±5.2 and 56.6±9.6 with a mean of 43.0±4.6 USP units per ml.

A portion of the vial product was subjected to stability determination by heating at a temperature of 100° C. for periods of 8 and 16 hours. The resulting products were analyzed by the SCG assay procedure using 8 rats per preparation. The potency of these products in USP units per ml. were as follows:

Initial potency_____ 43.0±4.6.
8 hours incubation___ 16.8 and 25.5 with a mean of 21.2.
16 hours incubation__ 12.4 and 16.8 with a mean of 14.6.

Another portion of the vial product was mixed with cysteine in the amount of 0.1% (weight/volume). The resulting solution was heated at a temperature of 100° C. for periods of 8 and 16 hours. The resulting preparations were analyzed by the SCG assay procedure using 8 rats per preparation.

The potencies of these preparations in USP units per ml. were as follows:

Initial potency_____ 43.0±4.6.
8 hours incubation___ 17.2 and 23.6 with a mean of 20.4.
16 hours incubation__ 13.6 and 14.4 with a mean of 14.0.

*Example XI*

Bovine ACTH prepared by the Bunding process, in the amount of 200 mgs., was suspended in 20 ml. of pyrogen-free distilled water. To this suspension was added 200 mgs. of pyridoxine hydrochloride, and the pH thereof was adjusted to 4.7 with a 1 N sodium hydroxide solution.

The suspension was filled into glass vials, and after sealing, the vials were immersed in a boiling water bath. Portions of the vial contents were removed at selected time intervals during incubation. These portions were diluted with 10 parts of an aqueous solution containing 16% of gelatin and 0.5% of phenol. These gelatin solutions were analyzed by the SCG assay procedure, using 8 rats per preparation. The results were as follows:

Time intervals (hours):        Potency (USP units/ml.)
 0 _____ 79
 1 _____ 140
 2 _____ 207
 3 _____ 444
 4 _____ 590
 4.5_____ 96
 5 _____ 48
 5.5_____ 64
 6 _____ 84

These results indicate that the inclusion of 1% of pyridoxine hydrochloride in the incubation mixture increases the rate of enhancement over that obtained with 2.5% of pyridoxine hydrochloride.

*Example XII*

Bovine ACTH, prepared by the Bunding process, in the amount of 200 mgs., was suspended in 100 ml. of a 16% aqueous gelatin solution containing 10 gms. of pyridoxine, 110 mg. of vitamin $B_{12}$ and 0.5% of phenol. The resulting suspension was incubated at a temperature of 32° C. Portions of the suspension were removed at selected time intervals during incubation. These portions were analyzed by the SCG assay procedure. The results were as follows:

Time interval (days):       Potency (USP units/ml.)
 0 _____ 12–16.
 2 _____ 30.4 (8 rats assay).
 9 _____ 43.0±6.0 (2–3 level assays—
                     36.0±4.8 mean=39.4±3.8).
 16 _____ 91.2±8.8 (3 level assay).

The product incubated for 16 days was filtered through an Ertel No. 8 pad and the sterile filtrate analyzed by the SCG assay procedure. This sterile product had a potency of 58.4±4.8 USP units per ml. (3 level assay).

*Example XIII*

The following formulations, using bovine ACTH produced by the Bunding process, were prepared:

*Product A.*—A 16% aqueous gelatin solution, containing 0.4 USP units per ml. of ACTH, which had not been treated with pyridoxine, and 0.5% of phenol.

*Product B.*—A 16% aqueous gelatin solution, containing 0.4 USP units per ml. of ACTH, which had not been treated with pyridoxine, in combination with 24.6 mcg. of vitamin $B_{12}$ per ml., 2.46 mg. of pyridoxine per ml. and 0.5% of phenol.

*Product C.*—A 16% aqueous gelatin solution, containing 0.4 USP units per ml. of the ACTH obtained after 16 days of incubation in the process of Example XII, in combination with 8 mcg. of vitamin $B_{12}$ per ml., 0.8 mg. of pyridoxine per ml., and 0.5% of phenol.

*Product D.*—A 16% aqueous gelatin solution, containing 0.4 USP units per ml. of ACTH obtained after 16 days of incubation according to the process of Example XII, in combination with 26.6 mcg. of vitamin $B_{12}$ per ml., 2.66 mg. of pyridoxine per ml., and 0.5% of phenol.

These products were analyzed by the SCG assay procedure, as follows:

Hypophysectomized rats, numbering 80, were divided into four groups of 20 rats each. Each group was injected with 0.5 ml. of one of the aforementioned products. Four of the rats in each group were sacrificed at selected time intervals after injection. The depletion in ascorbic acid content of the adrenal glands of the rats was determined and the results are set forth in the following table in terms of mcg. per mg. of adrenal weight at the selected time intervals:

| Product | Time Interval (hours) | | | | |
|---|---|---|---|---|---|
| | 1 | 2 | 3 | 5 | 7 |
| A | 3.48 | 3.28 | 2.98 | 3.60 | 4.26 |
| B[1] | 3.08 | 3.36 | 3.09 | 3.48 | 3.69 |
| C | 2.87 | 2.61 | 2.47 | 2.57 | 3.20 |
| D | 2.60 | 2.47 | 2.00 | 1.95 | 2.53 |

[1] This is an abnormal distribution of assay data.

*Example XIV*

Ovine ACTH prepared by the Bunding process, in the amount of 200 mg., was suspended in 20 ml. of pyrogen-free distilled water. To this suspension was added 500 mg. of pyridoxine hydrochloride, and the pH thereof was adjusted to pH 4.7 with an aqueous sodium hydroxide solution.

This suspension was incubated at temperature of 100° C. in a boiling water bath. Aliquots were removed at selected time intervals. These aliquots were diluted 1:10 with an aqueous 16% gelatin solution containing 0.5% of phenol. These diluted aliquots were analyzed by the SCG assay procedure. The results were as follows:

Time interval (hours):        Potency (USP units/ml.)
 0 _____ 5.2
 2 _____ 95.8
 3 _____ 98.0
 4 _____ 20.0
 5 _____ 8.8
 8 _____ Inactive These results indicate that maximal enhancement of ovine ACTH prepared by the Bunding process can be achieved with pyridoxine in an incubation period of less than 3 hours.

While in the foregoing specification various embodiments of this invention have been set forth and specific details thereof elaborated for the purpose of illustration, it will be apparent to those skilled in the art that this invention is susceptible to other embodiments and that many of these details can be varied widely without departing from the basic concept and spirit of the invention.

I claim:

1. The process which comprises incubating adrenocorticotrophin of submaximal subcutaneous potency with pyridoxine at a pH of from 4.0 to 5.5 and a temperature of from 37° C. to 150° C. to enhance the potency of said adrenocorticotrophin manifested upon subcutaneous administration.

2. The process of claim 1 in which said pyridoxine is pyridoxine hydrochloride.

3. The process which comprises incubating an aqueous mixture of adrenocorticotrophin of submaximal subcutaneous potency and pyridoxine at a pH of from 4.0 to 5.0 and a temperature of from 75 to 125° C. to enhance the potency of said adrenocorticotrophin manifested upon subcutaneous administration.

4. The process which comprises incubating an aqueous mixture of adrenocorticotrophin of submaximal subcutaneous potency and pyridoxine at a pH of about 4.7 to 4.8 and a temperature of about 90 to 100° C. to enhance the potency of said adrenocorticotrophin manifested upon subcutaneous administration.

5. The process of claim 4 in which said adrenocorticotrophin is ovine adrenocorticotrophin.

6. The process of claim 4 in which said adrenocorticotrophin is bovine adrenocorticotrophin.

7. The process of claim 4 in which said adrenocorticotrophin is porcine adrenocorticotrophin.

8. The process which comprises treating adrenocorticotrophin of submaximal subcutaneous potency with pyridoxine at a pH of from 4.0 to 5.5 and a temperature of from 37° to 150° C. to enhance the potency of said adrenocorticotrophin manifested upon subcutaneous administration and combining with the resulting product an organic reducing agent containing at least one sulfhydryl group to stabilize said adrenocorticotrophin.

9. The process of claim 8 in which said organic reducing agent is cysteine.

10. The process of claim 1 wherein said adrenocorticotrophin is bovine adrenocorticotrophin.

11. The process of claim 3 wherein said adrenocorticotrophin comprises a cellulose-purified, acid-acetone extract of beef pituitary tissue.

References Cited in the file of this patent

White: Proc. Soc. Exptl. Biol. and Med., vol. 78, No. 2, November 1951, page 313.

Ghosh: Fed. Proc., vol. 9, No. 1 (part 1), March 1950, pp. 176–177.

Dhotel: J. Sc. Med. de Lille, No. 3, 1953, pp. 117–129 (part. pp. 117, 121, 126 and 127).

U.S. Dispensatory, 25th ed., 1955, p. 369.

Collip: Symposia-Quant. Biol., vol. 5, 1937, pp. 210–217 (part. p. 212).